July 6, 1948.   J. H. RICHARDSON   2,444,531
CHUCK
Filed Jan. 5, 1946

PIPED TO
VACUUM SOURCE

INVENTOR.
John H. Richardson
Dale A. Bauer
ATTORNEY.

Patented July 6, 1948

2,444,531

UNITED STATES PATENT OFFICE 2,444,531

CHUCK

John H. Richardson, Needham, Mass., assignor to Polaroid Corporation, Cambridge, Mass., a corporation of Delaware Application January 5, 1946, Serial No. 639,208

2 Claims. (Cl. 51—235)

This invention relates to machinery for holding parts, such as for machining, grinding and the like, and more particularly to chucks adapted for use thereon.

One of the objects of the present invention is to provide novel chucks or workholders which are adapted to be mounted on the rotatable spindle of a lathe or the like and wherein the work piece, i. e., the part upon which work is to be done, is held in place by fluid pressure.

Another object of the invention is to provide novel apparatus of the above character which is so constructed that a minimum of pressure per unit of surface area of the piece being worked upon is required to maintain said piece in position.

A further object is to provide novelly constructed vacuum chuck means whereby a work piece may be held in position for rotary or other movement by fluid pressure without subjecting the same to either temporary or permanent deformation.

Still another object is to provide novel means for holding a part, particularly a light and flexible part, while drilling or machining the same.

A still further object is to provide novel means for holding pieces of a relatively soft and flexible nature, such as plastics for example, without subjecting the same to deformation as when they are held by mechanical means.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention, reference being had for this purpose to the appended claims.

Figure 1:
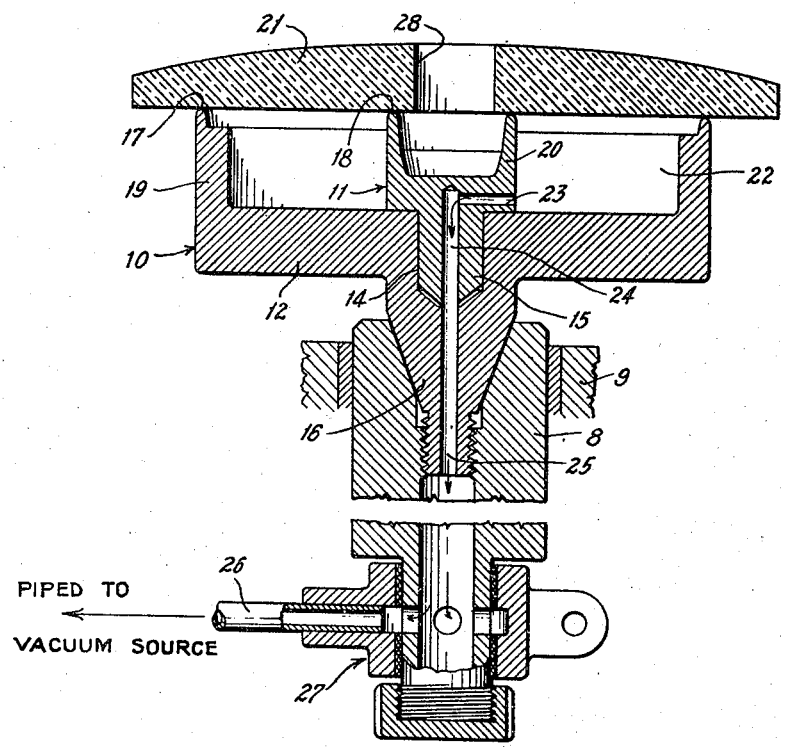
Figure 2:
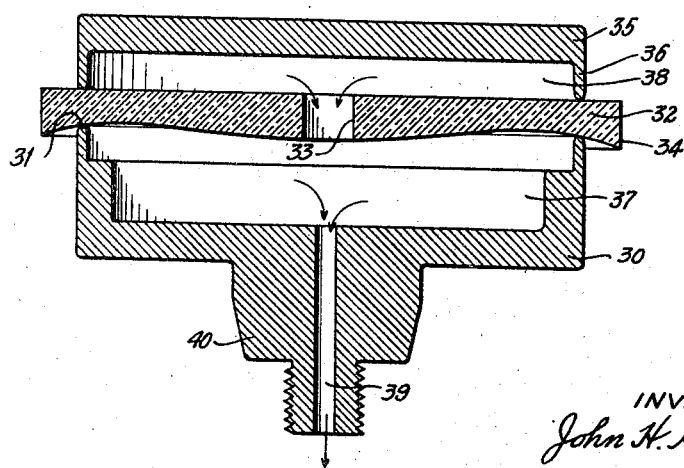

In the drawings, wherein like reference characters refer to like parts throughout the several views, Fig. 1 is a sectional elevation illustrating one form of chuck or workholder comprehended by the present invention with a work piece in operative position thereon; and Fig. 2 is a similar view showing a modified form of vacuum chuck and a work piece in operative position thereon.

The limited number of embodiments of the invention illustrated in the drawings by way of example are particularly adapted for use in holding a work piece of plastic or similar material for rotation, such as on the spindle 8 of a lathe 9, whereby said piece may be externally or internally machined, drilled, bored, polished or otherwise treated. Only the novel chucks are illustrated and described herein in detail, since many suitable types of lathes are old and well known to those skilled in the art. There are likewise many old and well known means for satisfactorily operatively connecting chucks of the character shown to a lathe spindle or other rotatable means. The features of the invention may likewise be employed in apparatus wherein the chuck or workholder is kept stationary or moved linearly as distinguished from rotatively during the machining of or other operation on the piece carried thereby.

In the embodiment of Fig. 1, the chuck comprises a cup-shaped body member 10, which may be cylindrical or of any other suitable shape, and a cup-shaped adaptor 11, which may be similarly shaped. The base or end wall 12 of body member 10 is centrally bored at 14 for receiving a reduced portion 15 of adaptor 11 and is provided with a centrally disposed extension or hub 16, whereby the same may be secured in any suitable known manner to spindle 8 of the lathe for rotation therewith.

For a purpose which will more fully appear hereafter in the description of the operation of the device, the outer edges 17 and 18 of peripheral flanges 19 and 20 on body member 10 and adaptor 11, respectively, are preferably, but not necessarily, designed to make substantially line contact with a work piece 21 to be drilled or otherwise worked upon. The edges 17 and 18 are shown as being convex surfaces of relatively small radius, but the same may be V-shaped if desired, and for some applications they may be flat. Parts 10 and 11 are so constructed and assembled that the edges 17 and 18 will engage the surface of work piece 21 along circular lines without bending or deformation. In the illustrated embodiment these edges are in a common plane since the surface of part 21 which is engaged thereby is a plane surface, but this may not be so in all cases.

It will be seen that when work piece 21 is in position on chuck 10, 11, an annular chamber 22 is formed inside of member 10 around adapter 11. Chamber 22 may be connected in any suitable manner, such as through drilled passages 23, 24 in adaptor 11, a central bore 25 in extension on hub 16 and the hollow interior of spindle 8, to a suction pump or other suitable source of low pressure or suction. Said source and passage 25 may be connected by means of piping, including the pipe 26, in which there may be provided any suitable known type of relatively airtight joint which will permit rotation of spindle 8 and chuck 10, 11 when such movement is desired. One suitable type of such a joint is illustrated generally at 27.

Although the chuck 10, 11 is shown as consisting of two separable parts, it will be understood that said parts may be rigidly secured together by welding or otherwise and, if desired, the chuck may be made as a single element. When the adaptor 11 is removable it becomes possible to readily insert other adaptors of different forms and sizes thereby adapting the chuck to take pieces of different shapes.

Thus, in operation, air is withdrawn from chamber 22 to thereby create a difference of fluid pressures on the opposite faces of work piece 21. This pressure differential may be controlled by a pre-set safety valve in the vacuum line and should be sufficient to hold disk 21 in position against edges 17 and 18 of the peripheral flanges 19 and 20. It will be understood that the particular pressure difference required will depend upon the kind of work to be done on piece 21, the weight of the piece, the force tending to dislodge it while it is being worked upon and other factors which will vary in each case. The total difference of pressure acting on the opposite surface areas of piece 21 will be effective to hold said piece in line contact with edges 17 and 18 so that the specific pressure applied at the contacting surfaces will be very large by comparison. Hence, a relatively small pressure difference is usually sufficient to hold piece 21 in position thereby avoiding the danger of temporary or permanent deformation of said piece. When the latter is thus held in position by fluid pressure, a hole 28 may be drilled therein or the internal surface of said hole may be machined, polished or the like without disturbing the vacuum or reduced pressure in chamber 22.

In the embodiment shown in Fig. 2, a cup-shaped chuck member 30 is provided for mounting in any suitable manner on a lathe spindle or the like, said member corresponding with member 10 of Fig. 1. The outer peripheral edge 31 of member 30 is preferably adapted to make substantially line contact with work piece 32, which may be a thin plastic element having a hole 33 therein, for example.

Novel means are provided whereby work piece 32 may be held in position on member 30 by fluid pressure while subjecting opposed portions of the opposite faces of said piece to equal pressures. All possibility of bending or flexing said piece by the action of the holding pressure is thus eliminated so that the peripheral surface 34, for example, may be machined to true cylindrical shape or any desired contour. The novel means thus provided comprises an adaptor cup 35, the flange 36 of which is preferably adapted to make substantially line contact with the outer face of work piece 32. The diameters of edge 31 and flange 36 are preferably equal and positioned to engage the faces of piece 32 along oppositely disposed lines. If desired, cup 35 may be larger or smaller than chuck 30, but in that case the force acting on opposite faces of part 32 would not be equalized. However, in some instances such equalization of pressure may not be important.

When the parts are in operative position as shown in the drawings, the space 37 within member 30, and the space 38 within holding cup 35 are in communication with each other through hole 33 thereby forming a closed chamber which may be wholly or partially evacuated in any suitable manner through a passage 39 in hub 40 of member 30. Said passage may be connected to a suction pump or the equivalent thereof in the same manner as passage 25 in the embodiment of Fig. 1.

When the pressure in chamber 37, 38 is reduced below the pressure of the surrounding atmosphere, the atmospheric pressure acting on the outer surface of cup 35 becomes effective to hold part 32 in the desired position for movement with chuck members 30 and 35. At the same time opposed points on both surfaces of part 32 are subjected to the same pressure. If the work piece 32 is not provided with one or more transverse openings therein for connecting spaces 37 and 38, other suitable external means may be provided for this purpose or said spaces may be connected with the source of vacuum in substantially the same manner that space 37 is connected therewith. If desired space 38 may be connected to a source of vacuum independently of space 37 through the head stock or tail stock of a lathe on which the apparatus is used and thus eliminate the necessity for center hole 33.

There is thus provided novel apparatus for holding parts or elements, such as thin plastic disks, for purposes of machining, drilling, grinding, polishing or the like, in a novel manner to prevent any deformation thereof which might result in a defective product. The novel structure provided is simple and inexpensive and may be used without the exercise of any special skill. Additionally, the invention provides means whereby a work piece may be quickly and easily positioned on a movable chuck thereby speeding up production and reducing the cost of manufacture.

Although only a limited number of specific embodiments of the invention are illustrated in the accompanying drawings, and described in the foregoing specification, it is to be expressly understood that the same is not limited thereto. Various changes in addition to those heretofore mentioned may be made, particularly in the size, shape and arrangements of the parts illustrated without departing from the spirit and scope of the invention. For a definition of the limits of the invention, reference is had primarily to the appended claims.

What is claimed is:

1. In apparatus of the class described, vacuum chuck means comprising a pair of oppositely disposed cup-shaped members engaging opposite surfaces of a work piece, each of said members making substantially line contact with the surface of said work piece, and means for partially evacuating the spaces within said cup-shaped members whereby said members and work piece are held against relative movement by the pressure of the surrounding atmosphere.

2. A chuck comprising cups having rims adapted to make sealing contact with opposite faces of a work piece, and means to evacuate the spaces within the cups equally whereby the work piece may be gripped between the cups without distortion.

JOHN H. RICHARDSON.

REFERENCES CITED

The following references are of record in the file of this patent:

UNITED STATES PATENTS

| Number | Name | Date |
| --- | --- | --- |
| 873,340 | Bagnall | Dec. 10, 1907 |
| 1,228,690 | Monnet | June 5, 1917 |
| 1,408,594 | Hatcher | Mar. 7, 1922 |
| 1,448,690 | Hetzer et al. | Mar. 13, 1923 |
| 1,456,673 | Dey | May 29, 1923 |
| 1,574,816 | Hill | Mar. 2, 1926 |
| 1,588,012 | Carrie | June 8, 1926 |
| 1,984,121 | Drescher | Dec. 11, 1934 |
| 2,321,383 | Harper | June 8, 1943 |